March 23, 1926.

C. A. NASH 1,578,060

COMBINED CAR SEAL AND LOCK

Filed July 23, 1924

3 Sheets-Sheet 1

WITNESSES

Inventor
CHARLES A. NASH

By Richard B. Owen
Attorney

March 23, 1926.
C. A. NASH
1,578,060
COMBINED CAR SEAL AND LOCK
Filed July 23, 1924    3 Sheets-Sheet 2
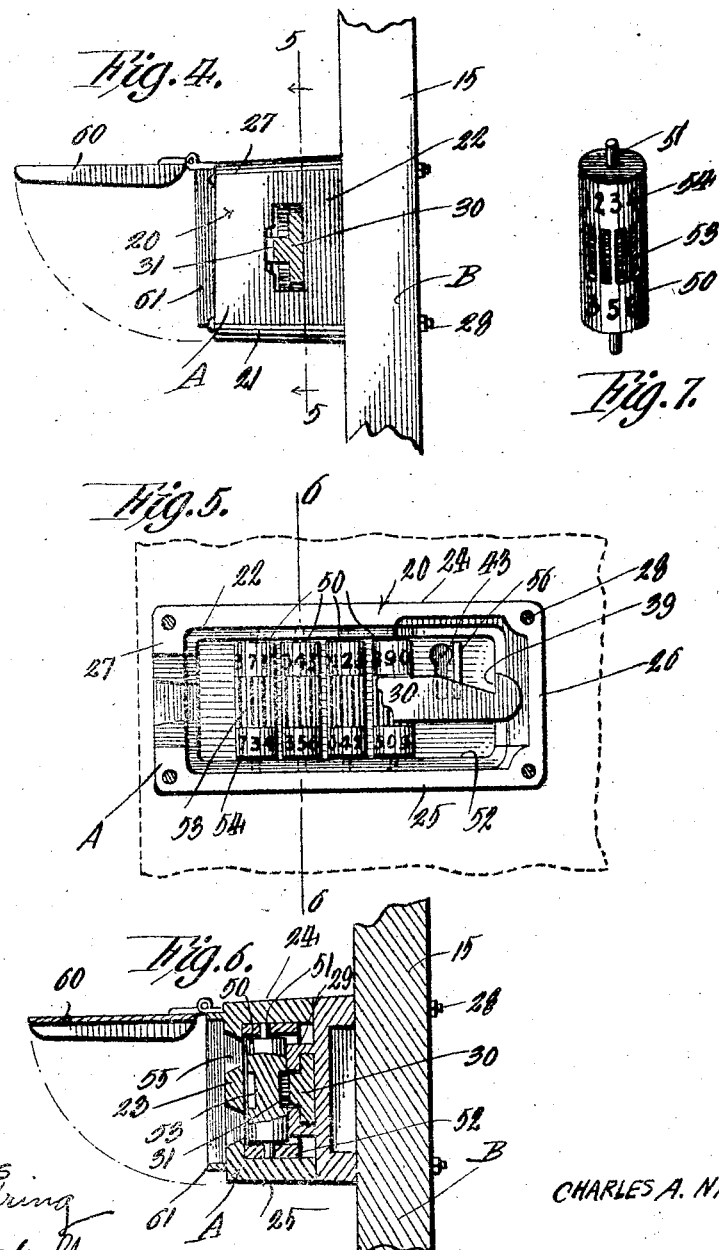

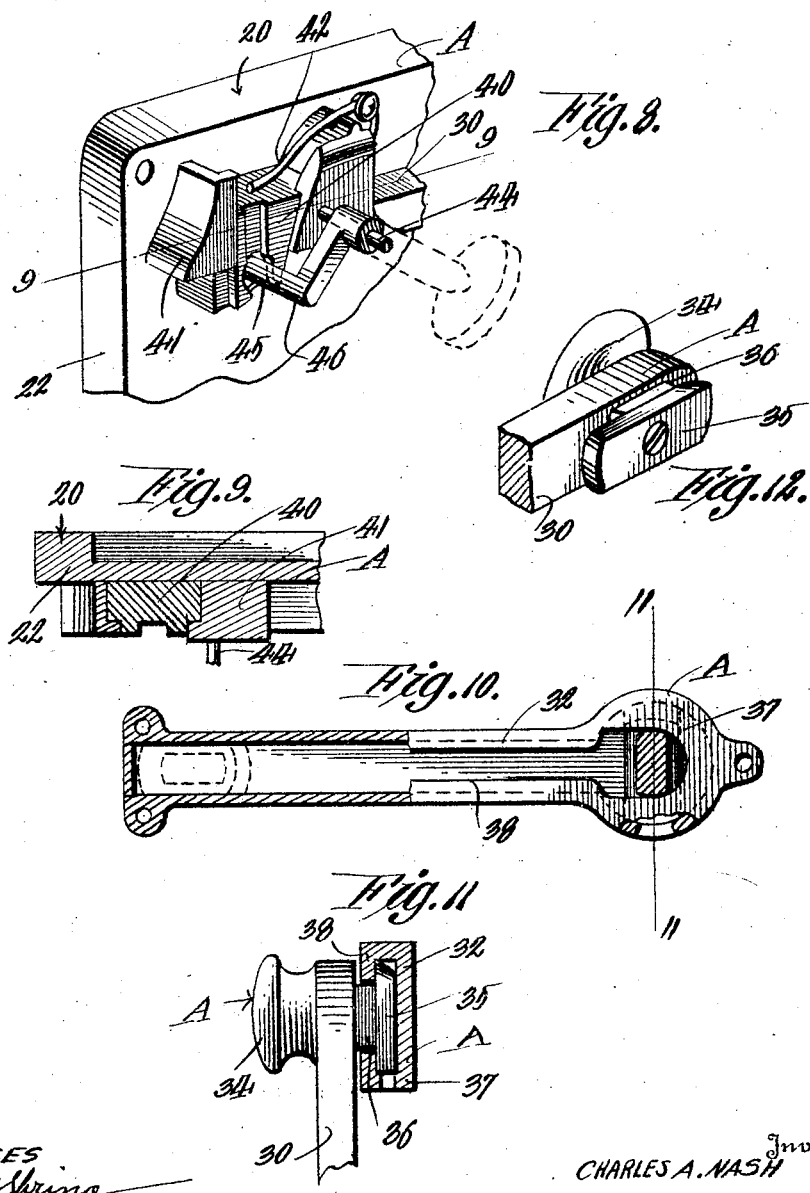

Patented Mar. 23, 1926.

1,578,060

UNITED STATES PATENT OFFICE.

CHARLES A. NASH, OF ASTORIA, OREGON, ASSIGNOR OF TWO-THIRDS TO RICHARD B. HYNES.

COMBINED CAR SEAL AND LOCK.

Application filed July 23, 1924. Serial No. 727,779.

*To all whom it may concern:*

Be it known that I, CHARLES A. NASH, a citizen of the United States, residing at Astoria, in the county of Clatsop and State of Oregon, have invented certain new and useful Improvements in Combined Car Seals and Locks, of which the following is a specification.

This invention appertains to railroad rolling stock and more particularly to a novel combined seal and lock for box car doors and the like.

The primary object of the present invention is to provide a positive lock for car doors having associated therewith novel identification numbered rollers, the rollers being so arranged relative to the lock, that a new combination of numbers, will be set up each time the lock is operated, thereby providing a positive means for showing whether the car has been tampered with or not, said means entirely eliminating the use of extraneous car seals and the like.

Another object of the invention is to provide a combined car seal and lock embodying a lock casing associated with the car body and a sliding locking bolt or tongue carried by the car door, the locking casing having key operating means for holding the bolt against unauthorized movement and a plurality of numbered rollers operatively connected with the locking bolt or tongue, the numbers on the rollers being adapted to be seen through suitable sight openings in the casing, the connection between the locking bolt or tongue and the rollers permitting a new combination of numbers to be set up upon operation of the said bolt or tongue.

A further object of the invention is to provide novel means for associating the locking bolt or tongue with the car door whereby the same can be readily moved into a locking or a nonlocking position.

A further object of the invention is to provide novel means for holding the locking bolt or tongue in place against unauthorized operation.

A still further object of the invention is to provide a novel car seal and lock of the above character, which will be durable and efficient in use, one that will be simple and easy to manufacture and one which can be placed upon the market and incorporated with a car at a small cost.

Figure 1:
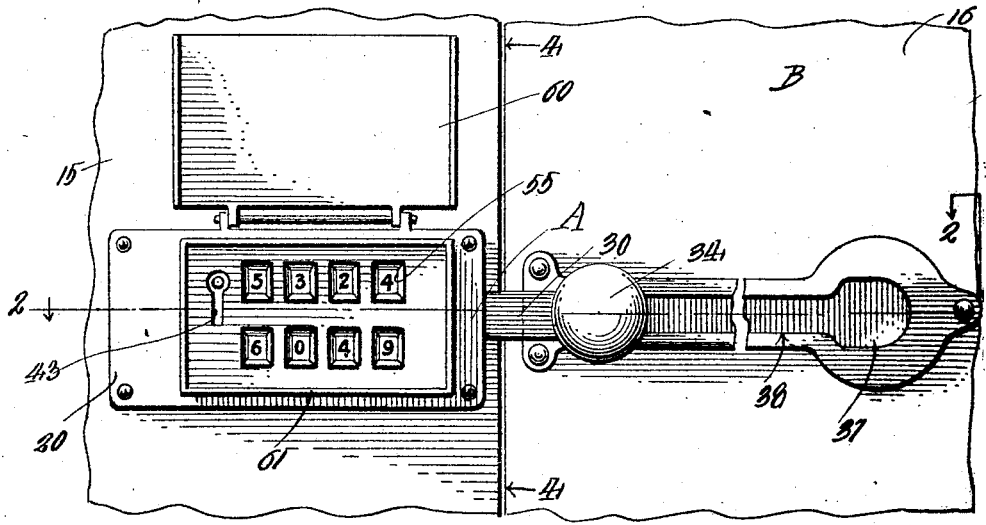
Figure 2:
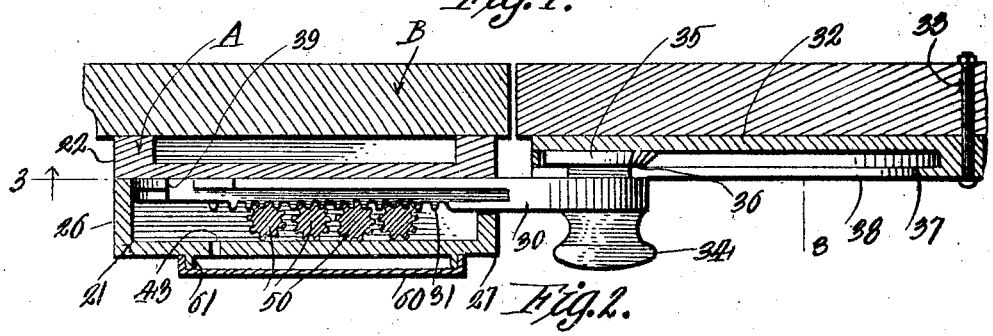
Figure 3:
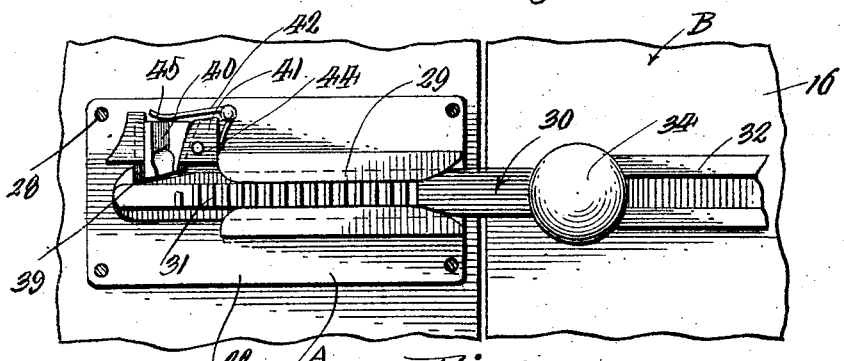

With these and other objects in view, the invention consists in the novel construction, arrangement and formation of parts, as will be hereinafter more specifically described, claimed, and illustrated in the accompanying drawings, in which drawings, Figure 1 is a side elevation of the improved combined car seal and lock showing the same in its locked position on a car, the hinged cover of the casing being shown in a raised position to disclose to view the seal number, Figure 2 is a horizontal section through the combined lock and seal taken on the line 2—2 of Figure 1, Figure 3 is a vertical longitudinal section taken on the line 3—3 of Figure 2 looking in the direction of the arrows, Figure 4 is a transverse section through the locking seal taken on the line 4—4 of Figure 1 looking in the direction of the arrows, Figure 5 is a vertical longitudinal section through the lock casing taken on the line 5—5 of Figure 4 looking in the direction of the arrows, Figure 6 is a transverse vertical section through the lock casing taken on the line 6—6 of Figure 5, Figure 7 is a detail perspective view of one of the novel seal rollers, Figure 8 is a detail fragmentary perspective view showing a portion of the interior of the lock casing and illustrating the novel means for engaging the lock bolt or tongue to hold the same against unauthorized movement, the key for both holding means being shown in place and broken away, Figure 9 is an enlarged detail horizontal section taken on the line 9—9 of Figure 8, Figure 10 is a side elevation of the guide for the lock bolt and tongue, showing parts thereof broken away and in section, the lock bolt or tongue being also shown in section, Figure 11 is a transverse section through the guide of the lock bolt or tongue taken on the line 11—11 of Figure 10, Figure 12 is a fragmentary detail perspective view of the inner end of the lock bolt or tongue showing the novel guide head carried thereby for engaging the guide carried by the door.

Referring to the drawings in detail, wherein similar reference characters designate corresponding parts throughout the several views the letter A generally indicates the improved combined car seal and lock and B a car with which the same is associated.

The car B is of the usual or any preferred character and includes the body 15 and the sliding door 16.

The improved combined car seal and lock A comprises a lock casing 20 which is adapted to be rigidly secured, by means which will be hereinafter more fully described to the car body 15 adjacent to the door opening. This lock casing 20 is preferably formed from cast metal and includes a front section 21 and a back plate section 22. The front section 21 includes the front wall 23 and the top, bottom and side walls 24, 25, 26 and 27 which are placed in abutting engagement with the back plate section 22. The sections 21 and 22 are held in place by suitable bolts or the like 38 which extend through the car body as clearly shown in Figures 4 and 6 of the drawings which hold the entire lock casing in place. The bolts can have their inner ends provided with suitable washers and nuts for holding the casing in place against accidental displacement. The back plate section 22 is provided with a longitudinally extending guide 29 for receiving the locking bolt or tongue 30 when the same is in its operative position as clearly shown in Figures 1 to 3 inclusive. This lock bolt or tongue 30 is provided with a raised longitudinally extending rack bar 31 for a purpose, which will be hereinafter more fully described, and is carried by a novel guide 32 which is bolted as at 33 to the car door. The bolt or tongue 30 has its outer end provided with a rigid manipulating knob 34 and an inwardly directed elongated head 35 which is slidably mounted within the guide 32. This elongated head 35 is connected with the outer end of the bolt or tongue 30 by means of a reduced neck portion 36 as clearly shown in Figure 11 of the drawing. The extreme outer end of the guide 32 is provided with a circular enlargement 37 which permits the turning of the elongated head 35 therein. It is to be noted at this point that the elongated head 35 fits snugly within the guide 32 so that the normal turning movement of the lock bolt or tongue is prevented and that the displacement of the head from the guide is prevented by inwardly directed guide flanges 38. The inner end of the lock bolt or tongue 30 is provided with a notch 39 into which is adapted to spring the locking latch or dog 40 when the bolt or tongue is in its extreme operative locking position. It is of course evident that when the dog or locking latch 40 is in its operative position as shown in Figure 3 of the drawing that opening movement of the bolt will be prevented. The locking latch or dog 40 is of a dove tail shape in cross section and is fitted within a dove tail guide 41 carried by the outer face of the back plate 22 of the casing 20. The lower edge of the dog in on an incline in order to permit the raising of the dog by the bolt when the same is being inserted into the casing. This dog is normally urged into engagement with the upper face of the lock bolt by means of a suitable leaf spring 42.

The front wall 23 of the casing 20 is provided with a key hole 43 arranged directly in front of the dog 40 and a key guide and baffle pin 44 is carried by the dove tail guide 41 in order to render the picking of the lock difficult. The dog is provided with a notch 45 for receiving the inner end of the key.

By referring to Figure 8 of the drawing it can be seen that when the proper key is placed in the lock that the guide and baffle pin 44 will extend into the shank of the key and that the bit of the key, indicated by the reference character 46, will extend into the notch 45 and permit the lifting of the tumbler dog when the key is turned. The lifting of the tumbler dog 40 will of course permit the sliding out of the bolt from the lock casing by the knob 34 and when the head 35 reaches the annular enlargment 37 of the guide 32 the bolt can be swung downwardly.

In accordance with this invention a plurality of transversely extending rollers 50 are mounted within the lock casing 20 and these rollers 50 are provided at their terminals with bearing pintles 51 which are freely rotatably mounted within a frame 52 fitted in the lock casing and carried by the top and bottom walls 24 and 25 thereof. The intermediate portion of each roller 50 is provided with pinion teeth 53 for meshing with the rack bar 31 formed longitudinally on the lock bolt 30. The portions of the rollers 50 above and below the pinion teeth 53 are provided with a plurality of indicating numbers 54 and the front wall 23 of the lock casing is provided with upper and lower sets of sight openings 55 through which the numbers one at a time are adapted to appear.

In order to make the operation of the lock more difficult except by the correct key, a guard flange 56 is carried by the front wall 23 and arranged adjacent to the key hole as clearly shown in Figure 5 of the drawing.

In operation of the improved device, the door 16 is closed in the usual manner after which the bolt or tongue 30 is slid within the casing 20 and as the bolt is slid in place the rack bar 31 thereon will engage the pinion teeth on the rollers 50 and thus turn the rollers. When the bolt has been shot all the way home the tumbler or dog 40 will spring downward into the notch 39 thus holding the bolt against operation. By glancing at the front wall or plate 23 the seal number can be found, which can of course be written down in the usual way. Now each time the bolt is operated a new combination of numbers will be set up which will serve as means for showing whether or not the lock has been tampered with.

It is to be noted at this point that the rollers 50 are mounted for free rotary movement and that the bolt 30 is relatively hard to move back to its inoperative position. This will necessitate a quick shove being given the bolt which will rotate the rollers 50 and thus position the rollers so that a new combination of numbers will be set up when the bolt is returned to its locking position.

The lock is unlocked in the manner as heretofore described.

It is preferred to provide a hinged cover 60 for the front plate 20 of the lock casing in order to normally hide, the sight openings 55 and the key hole 43 from view and a flange 61 surrounds the sight openings and the key hole on which the cover is adapted to normally rest, as clearly shown in Figure 2 of the drawing.

From the foregoing description, it can be seen that I have provided an exceptionally simple and strong lock for freight cars and the like in which a new seal number will be set up each time the lock is operated.

Changes as to details may be made without departing from the spirit or the scope of this invention but:—

What I claim as new is:—

1. In a device of the character described a casing, a guide arranged in longitudinal alignment with the casing, a lock bolt slidably mounted within the guide for movement into and out of the lock casing, the inner end of the bolt having a notch formed therein, a dove tail guide in the casing disposed at right angles to the path of travel of the bolt, a dove-tail locking tumbler slidably mounted within the dove tail guide, the lower end of the tumbler being inclined upwardly toward the free end of the bolt, spring means normally urging the tumbler in engagement with the bolt and into said notch, the casing having a key hole therein, and said tumbler being provided with a key bit receiving notch.

2. The combination with a freight car including a body and a sliding door, of a lock therefor including a casing carried by the car body and a guide carried by the door disposed in longitudinal alignment with the casing, the outer end of the guide remote from said casing being provided with an annular enlargement, a bolt slidably carried by the guide for movement into and out of the casing, key operated lock means for engaging the bolt to hold the same against movement in the casing, a head carried by the outer end of the bolt, a reduced neck portion connecting the head with the bolt, the head being adapted to ride into the annular enlargement when the bolt is out of engagement with the casing, whereby rotary movement of the bolt is permitted.

3. In a combined car seal and lock, a casing having a plurality of sight openings therein arranged in an upper and a lower set, a guide, a slide bolt carried by the guide and arranged for movement into and out of the casing, releasable key operating means for engaging the bolt when the same is in the casing for normally holding the same against movement by unauthorized persons, a plurality of transversely extending rollers rotatably mounted in the casing, upper and lower sets of numbers carried by the roller arranged to appear through the upper and lower sets of sight openings, pinion teeth formed on the rollers between the upper and lower sets of numbers and a longitudinally extending rack bar carried by the outer face of the bolt for engaging said pinion teeth, as and for the purpose specified.

In testimony whereof I affix my signature.

CHARLES A. NASH.